MICROWAVE SUPPRESSED CARRIER MODULATOR

Filed April 14, 1958

INVENTORS
HERBERT L. ROBINSON
CHARLES I. SMITH
MACK M. ZIMET.
BY Victor D. Borst
ATTORNEY

United States Patent Office 2,936,429

Patented May 10, 1960

2,936,429

MICROWAVE SUPPRESSED CARRIER MODULATOR

Herbert L. Robinson, Jamaica, Charles I. Smith, Kew Gardens, and Mack M. Zimet, Brooklyn, N.Y., assignors to Sperry Rand Corporation, Ford Instrument Company Division, Long Island City, N.Y., a corporation of Delaware Application April 14, 1958, Serial No. 728,367

4 Claims. (Cl. 332—45)

Figures 1, 2:
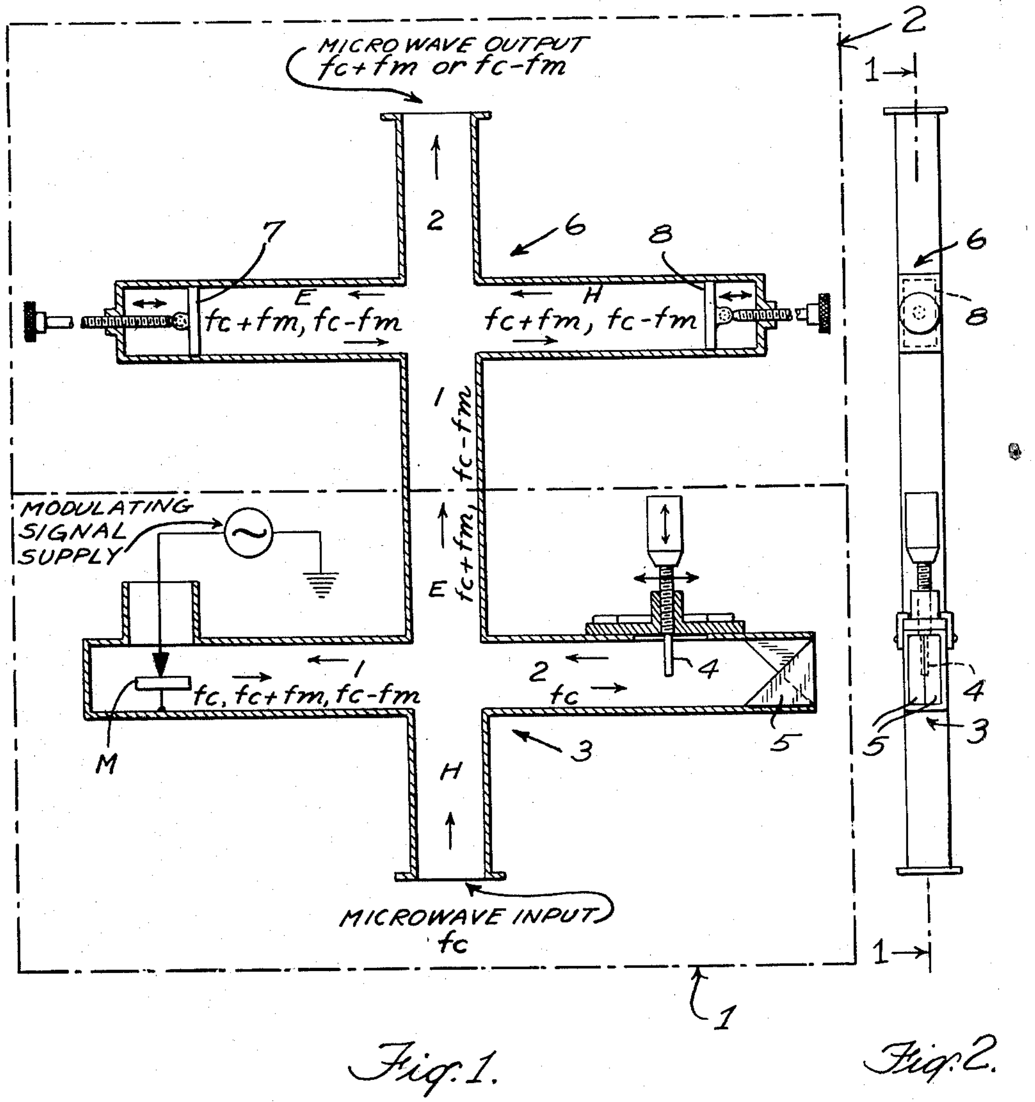

This invention relates to microwave devices and more particularly to an arrangement of microwave components which are adapted to serve as a frequency shifter.

According to the invention, the microwave device operates to yield a single sideband signal whose frequency differs from a microwave carrier frequency by the frequency of a modulating signal. In order to produce the single sideband frequency, it is necessary to provide a microwave arrangement which acts to suppress the carrier frequency and to subsequently cancel one of the two sideband frequencies produced by the carrier frequency suppressor.

The invention then contemplates the provision of a matched hybrid junction which is preferably in the form of a waveguide magic tee, in one arm of which there is mounted a crystal adapted to receive the carrier frequency and modulating signal and a second arm of which is provided with a variable mismatch. A third arm of the magic tee receives the carrier frequency being substantially decoupled from the fourth arm which transmits the generated double sideband signal to a second magic tee having a pair of variable mismatches which can be employed to suppress one of the sideband signal frequencies as desired.

The efficiency of the device is largely dependent upon its peculiar capacity to suppress the carrier frequency in the input waveguide unit. It is found that the particular means devised for the suppression of the carrier is capable of achieving carrier suppression of greater than 40 db while hitherto using conventional microwave techniques it has not been possible to obtain carrier suppression, below the sideband level, of substantially more than 15 db.

One object of the invention is to provide an efficient microwave suppressed carrier modulator.

A second object of the invention is to provide an arrangement of microwave components capable of modulating a carrier wave and generating a single sideband carrier frequency.

Other objects and advantages of the device may be appreciated by reading the following specification taken in conjunction with the drawing which illustrates schematically a microwave single sideband generator employing two magic tees.

One embodiment of the invention is illustrated in the drawings in which Fig. 1 is a section taken on line 1—1 of Fig. 2 and Fig. 2 is an end view of the microwave suppressed carrier modulator.

As shown in the drawing, the single sideband generator comprises generally a microwave suppressed carrier modulator 1 and a sideband suppressor 2. The suppressed carrier modulator has a matched hybrid junction 3 which is shown in the form of a magic tee but alternatively might take the form of a short slot hybrid coupler, a broad wall hybrid coupler or a hybrid ring. The H arm of the magic tee is adapted to receive the microwave input carrier of frequency $f_c$. The #1 arm of the magic tee is provided with a modulator which consists of a semiconductor diode M having terminals for receiving the microwave carrier and the modulating signal of frequency $f_m$ generated by the modulating signal supply. The modulation signal is assumed to be substantially below the carrier frequency $f_c$.

The #2 arm of the magic tee is provided with a variable mismatch which functions to control the reflected signal and cancel the impressed carrier. The variable mismatch preferably takes the form of a slide screw tuner 4 positioned in advance of a matched load attenuator 5. For variable input carrier frequencies, the slide screw tuner may be mechanically ganged with the carrier oscillator to insure suppression over the band of input frequencies. The variable mismatch may, of course, comprise other forms which will serve to make the adjustment in phase and magnitude to effect carrier cancellation in the junction of the magic tee.

In operation of the suppressed carrier modulator, the carrier signal is delivered to one terminal of the matched hybrid junction so that one-half its power is delivered to the modulator and one-half is incident upon the variable mismatch. The terminal of the hybrid junction containing the carrier signal is highly decoupled from the terminal containing the output load in arm E so that negligible leakage occurs between these terminals. After the carrier has been modulated there are incident upon the matched hybrid junction from the modulator three waves having frequencies of $(f_c-f_m)$, $f_c$, and $(f_c+f_m)$. Incident upon the junction from the variable mismatch is one wave of frequency $f_c$. The value of the mismatch, the admittance of which contains both conductive and susceptive components, is adjusted by the tuner so that the magnitude and phase of the wave reflected at its terminal is capable of cancelling the carrier wave incident on the hybrid junction from the modulator arm. As a result of this cancellation, only waves of sideband frequency $(f_c-f_m)$ and $(f_c+f_m)$ are transmitted to the load in arm E of the magic tee.

A second hybrid junction comprising preferably a magic tee 6 is arranged so that the #1 arm of the latter is in communication with the load arm E of the hybrid junction 3, the output of which is composed of two sidebands whose frequency is shifted from the carrier frequency by an amount equal to the modulation frequency. Variable mismatches, comprising in this instance a sliding short 7 and a sliding short 8, are disposed in the E and H arms, respectively, of the hybrid junction 6. The sliding shorts 7 and 8 serve to vary the reflection of the two sideband signals after the latter have suffered a one-half power loss by reason of their division in the E and H arms of the second magic tee. As a consequence of this adjustment, the magnitude of one of the sideband frequencies is cancelled at the junction while the other is increased. In this manner, either the upper or lower sideband frequency may be selected for delivery to the output load of the #2 arm of the hybrid junction 6. It has been found that by proper tuning, the sideband chosen for transmission to the output load can be made to be 40 db above the suppressed sideband where the two sideband frequencies were 60 mcs. apart.

Various modifications in the microwave device herein described may be effected by persons skilled in the art without departing from the scope and principle of the invention as defined in the following claims.

What is claimed is:

1. A microwave single sideband generator comprising a first matched hybrid junction having a crystal mounted in one arm and a variable mismatch disposed in a second arm, said crystal being adapted to receive a modulating signal, said variable mismatch being adapted to make adjustment in phase and magnitude of microwave frequencies, a third arm of said hybrid junction being adapted to receive a microwave input carrier signal, a second hybrid junction communicating with the fourth arm of said first hybrid junction, said second hybrid junction having a pair of arms with a variable mismatch disposed in each of the arms thereof, whereby the output arm of said second hybrid junction is adapted to yield a single sideband wave which differs in frequency from said microwave input carrier frequency by the frequency of said modulating signal.

2. A microwave single sideband generator comprising a matched magic tee having a crystal mounted in one arm and a variable mismatch in a second arm, said crystal being adapted to receive a modulating signal, said variable mismatch being adapted to make adjustment in phase and magnitude of microwave frequencies, a third arm of said magic tee being adapted to receive a microwave input carrier signal, a second magic tee communicating with the fourth arm of said first magic tee, said second magic tee having a pair of arms with a variable mismatch disposed in each of the arms thereof whereby the output arm of said second magic tee is adapted to yield a single sideband wave which differs in frequency from said microwave input carrier frequency by the frequency of said modulating signal.

3. A microwave single sideband generator as claimed in claim 2 wherein the variable mismatch disposed in said first magic tee comprises a matched load attenuator and a slide screw tuner disposed in advance thereof.

4. A microwave single sideband generator as claimed in claim 3 wherein the variable mismatches disposed in said second magic tee are of the sliding short type.

References Cited in the file of this patent

UNITED STATES PATENTS

| | | |
|---|---|---|
| 2,410,840 | Samuel | Nov. 12, 1946 |
| 2,468,237 | Sanders | Apr. 26, 1949 |
| 2,637,813 | Braden | May 5, 1953 |
| 2,652,541 | Cutler | Sept. 15, 1953 |
| 2,831,974 | Wright et al. | Apr. 22, 1958 |
| 2,850,626 | Tomiyasu | Sept. 2, 1958 |